(12) United States Patent
Baek et al.

(10) Patent No.: US 8,737,802 B2
(45) Date of Patent: May 27, 2014

(54) METHOD FOR PROVIDING CHANNEL SERVICE

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 682 days.

(21) Appl. No.: 12/457,508

(22) Filed: Jun. 12, 2009

(65) Prior Publication Data

US 2009/0316776 A1    Dec. 24, 2009

(30) Foreign Application Priority Data

Jun. 20, 2008  (KR) .................. 10-2008-0058198

(51) Int. Cl.
*H04N 5/932*    (2006.01)
(52) U.S. Cl.
USPC ........................................ 386/215; 386/216
(58) Field of Classification Search
USPC ................................................ 386/215, 216
See application file for complete search history.

(56) References Cited

U.S. PATENT DOCUMENTS

| | | | |
|---|---|---|---|
| 2005/0125533 A1* | 6/2005 | Svanbro et al. | 709/225 |
| 2006/0153022 A1* | 7/2006 | Seo et al. | 369/30.23 |
| 2007/0086727 A1* | 4/2007 | Tanaka et al. | 386/95 |
| 2007/0198468 A1* | 8/2007 | Berger | 707/2 |
| 2008/0244658 A1* | 10/2008 | Chen | 725/50 |
| 2009/0097821 A1* | 4/2009 | Yahata et al. | 386/95 |
| 2009/0271411 A1* | 10/2009 | Takashima et al. | 707/10 |

* cited by examiner

*Primary Examiner* — Thai Tran
*Assistant Examiner* — Jose Mesa
(74) *Attorney, Agent, or Firm* — Stein IP, LLC

(57) ABSTRACT

A method for providing a channel service is disclosed. In accordance with the present invention, a fixed information including a BUMF information, an SF information and a playlist information and a variable information including a clip information associated with a streaming data of a selected channel service are transmitted to a playback apparatus supporting a BD-J specification, thereby enabling a Blu-ray player incapable of playing the streaming data to provide viewers with the streaming data of the channel service.

23 Claims, 3 Drawing Sheets

METHOD FOR PROVIDING CHANNEL SERVICE

This application claims the benefit of Korean Patent Application No. 10-2008-0058198 filed on Jun. 20, 2008, which is hereby incorporated for reference.

BACKGROUND OF THE INVENTION

1. Field of the Invention

The present invention relates to a method for providing a channel service, and more particularly to a method for providing a channel service wherein a fixed information and a variable information associated with a streaming data of a channel service are transmitted to a playback apparatus supporting a BD-J specification to enable a streaming of the channel service.

2. Description of the Related Art

A Blu-ray specification is designed by Blu-ray Disc Association ("BDA"), whose members include Sony, Hitachi and Sharp. The Blu-ray specification includes a specification of a Blu-ray disk which is an optical disc that may be read and recorded using a blue laser.

While a diameter and a thickness of the Blu-ray disk, which are 12 cm and 1.2 mm, respectively, are same as those of conventional CD (Compact Disc) and DVD (Digital Versatile Disc), a storage capacity thereof is larger than those of the conventional CD and DVD.

Because the blue laser having a wavelength of 405 nm is used for reading the Blu-ray disk instead of a red laser having a wavelength of 650 nm used for reading the DVD, more data can be stored in the Blu-ray disk than the DVD.

Specifically, a single layer Blu-ray disk is capable of storing up to 25 GB of a data and a dual layer Blu-ray disk is capable of storing up to 50 GB of the data. This means that the Blu-ray disk can store five times more data than the DVD.

Moreover, a quad layer Blu-ray disk and an octal layer Blu-ray disk can store up to 100 GB and 200 GB, respectively.

The Blu-ray disk supports a video compression codec of MPEG-2 which is widely used in the DVD. Moreover, BDA standard specification requires the Blu-ray disk to use H.264/AVC or VC-1 as the video compression codec which provides improved compression ratio compared to MPEG-2.

In addition, the Blu-ray disk supports audio formats such as Dolby Digital Plus, Dolby TrueHD and DTS-HD Master Audio as well as PCM (Pulse-code modulation), Dolby Digital and DTS.

A Blu-ray player supporting a BD-J specification supports an interactive service based on JAVA. Moreover, the Blu-ray player supporting the BD-J specification supports a network connectivity, a PIP(Picture-In-Picture) and a connection to a local storage.

A Blu-ray player supporting a BD-Live specification is capable of playing the streaming data received through a network communication in addition to capabilities of the Blu-ray player supporting a BD-J specification.

A Virtual File System ("VFS") enables a playback of a data which is not stored in the Blu-ray disk. Specifically, the VFS configures a virtual package on the Blu-ray player to enable the Blu-ray player to play the streaming data received through a USB or the network communication as if the streaming data is stored in the Blu-ray disk.

Hereinafter, "a playback apparatus supporting the BD-J specification" includes the Blu-ray player supporting the BD-J specification or an apparatus using a middleware supporting the BD-J specification such as a TV, a set-top box, a PMP (Portable Multimedia Player), a video game console, a PC (Personal Computer) and a PVR(Personal Video Recorder).

The apparatus using the middleware supporting the BD-J specification is not required to have a Blu-ray disk reading capability.

FIG. 1 is a diagram illustrating a configuration for providing an audio/video data in accordance with a conventional method.

A content providing server generates a BUMF (Binding Unit Manifest File) information, an SF (Signature File) information, a playlist information, a clip information and a movie clip according to the BD-J specification.

The BUMF information defines a configuration of a virtual package in XML (Extensible Markup Language) format. For instance, the BUMF information includes a file name information and a binding information on the movie clip included in the audio/video data received from the content providing server.

The SF information is used for verifying a validity of the BUMF information. The SF information uses SHA (Secure Hash algorithm)-1.

The playlist information includes an information on the audio/video data to be played. For instance, the playlist information includes a playback sequence information, a PlayItem information and a PlayListMark information on the movie clip included in the audio/video data.

The clip information includes an information required for playing the movie clip. For instance, the clip information includes a stream format information of the corresponding clip, a number of packets included in the corresponding clip, an encoding specification of the corresponding clip and a time stamp information.

The playback apparatus stores the BUMF information, the SF information, the playlist information and the clip information received from the content providing server in a BUDA (Binding Unit Data Area). The playback apparatus carries out a package update from a disk package to the virtual package based on the BUMF information, the SF information, the playlist information and the clip information stored in the BUDA. That is, the playback apparatus is configured to play the audio/video data received from the content providing server instead of playing a data stored in the Blu-ray disk.

When the playback apparatus is fully configured, the playback apparatus receives and plays the audio/video data from the content providing server.

In order to play the audio/video data received from the content providing server, the playback apparatus must identify a size of the audio/video data, the number of clips included in the audio/video data, a encoding algorithm of the clip and a validity verification information by receiving the BUMF information, the SF information, the playlist information and the clip information from the content providing server.

However, in case of the channel service such as a live broadcasting wherein the audio/video data is continuously generated and transmitted in real time, the BUMF information, the SF information, the playlist information and the clip information cannot be generated for the audio/video data that constantly changes with time.

Without the BUMF information, the SF information, the playlist information and the clip information, the playback apparatus cannot carry out the package update from the disk package to the virtual package. As a result, the audio/video data of the channel service cannot be played by the playback apparatus.

SUMMARY OF THE INVENTION

It is an object of the present invention to provide a method for providing a channel service wherein a fixed information and a variable information associated with a streaming data of a channel service is transmitted to a playback apparatus supporting a BD-J specification, to enable a streaming of the channel service.

In order to achieve above-described object of the present invention, there is provided a method for providing a channel service, the method comprising steps of: (a) transmitting a fixed information associated with a streaming data of the channel service to a playback apparatus supporting a BD-J specification; (b) transmitting a variable information associated with the streaming data to the playback apparatus; and (c) transmitting the streaming data to the playback apparatus.

Preferably, the step (a) comprises transmitting the fixed information to the playback apparatus according to a request for the channel service received from the playback apparatus.

Preferably, the step (b) comprises transmitting the variable information to the playback apparatus according to a transmission request for the variable information received from the playback apparatus.

Preferably, the variable information includes a clip information corresponding to each of one or more clips included in the streaming data.

Preferably, the step (b) comprises transmitting the clip information to the playback apparatus, and wherein the step (c) comprises transmitting one of the one or more clips corresponding to the clip information to the playback apparatus according to the transmission request.

Preferably, the step (b) comprises storing the one or more clips in a circular queue in a storage space.

Preferably, the fixed information includes at least one of a BUMF information, an SF information and a playlist information associated with the streaming data.

There is also provided a method for providing a channel service using a playback apparatus supporting a BD-J specification, the method comprising steps of: (a) receiving a fixed information associated with a streaming data of the channel service; (b) configuring the playback apparatus for a playback of the streaming data based on the fixed information; (c) receiving a variable information associated with the streaming data; and (d) playing the streaming data based on the fixed information and the variable information.

Preferably, the step (a) comprises receiving the fixed information from a channel service providing server according to a request for the channel service included in a user input.

Preferably, the step (b) comprises configuring a virtual package for the playback of the streaming data based on the fixed information.

Preferably, the step (c) comprises receiving the variable information transmitted from a channel service providing server according to a request for the fixed information.

Preferably, the variable information includes a clip information corresponding to each of one or more clips included in the streaming data.

Preferably, the step (c) comprises receiving the clip information, and wherein the step (d) comprises playing one of the one or more clips corresponding to the clip information.

Preferably, the fixed information includes a playback sequence information on the one or more clips, and wherein the step (d) comprises playing the one or more clips according to the playback sequence information.

The method in accordance with the present invention may further comprising (e) storing the one or more clips including the streaming data in a storage space.

Preferably, the one or more clips stored in the storage space are in a circular queue.

Preferably, the step (d) comprises reading and playing at least one of the one or more clips stored in the storage space, the at least one being selected according to a user input.

Preferably, the fixed information includes at least one of a BUMF information, an SF information and a playlist information associated with the streaming data.

DETAILED DESCRIPTION OF THE INVENTION

A method for providing a channel service in accordance with the present invention will be described in detail with reference to accompanied drawings.

Figure 1:
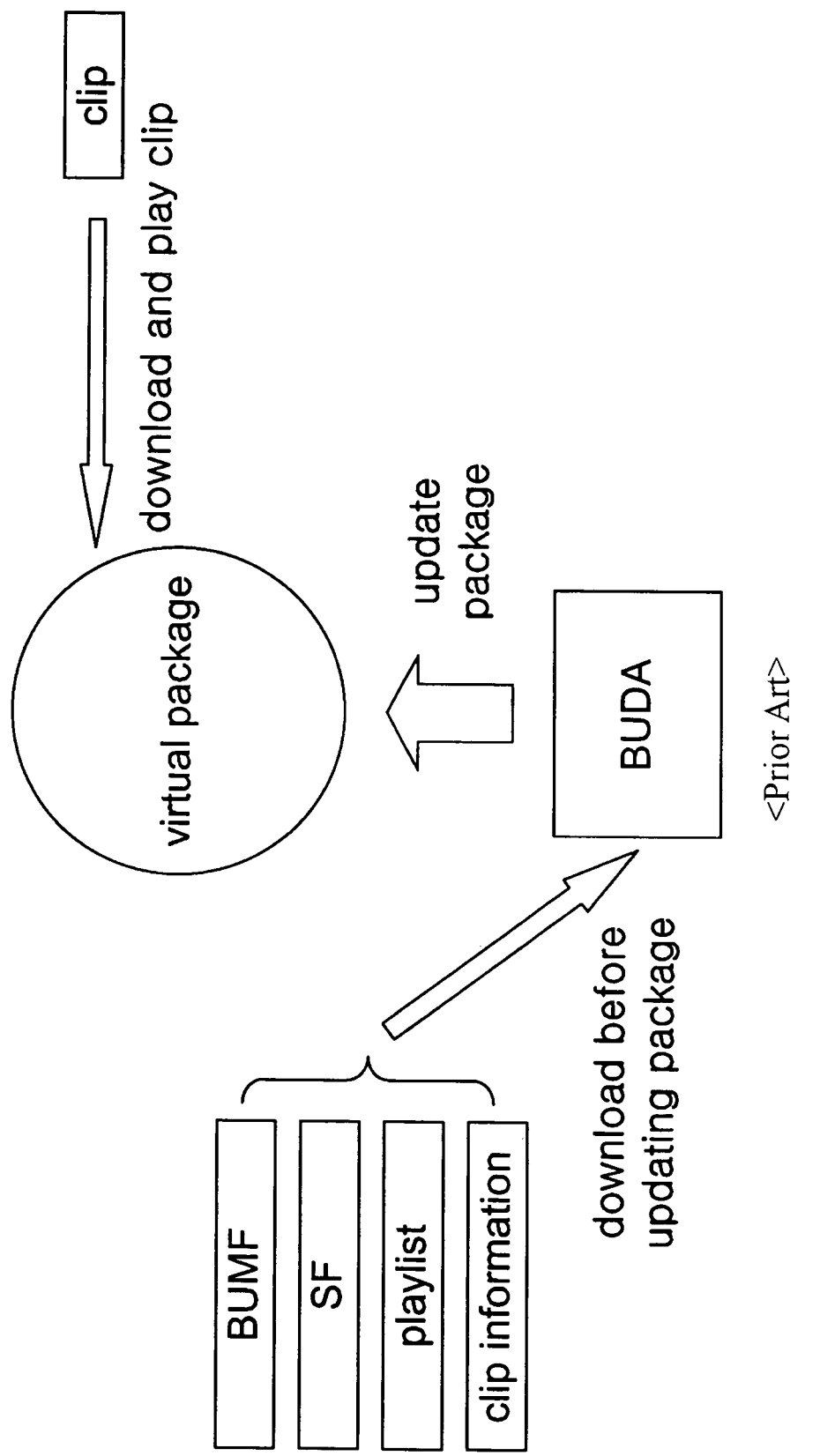
FIG. 1 is a diagram illustrating a configuration for receiving a multimedia content via a network in a conventional playback apparatus supporting a BD-J specification.
Figure 2:
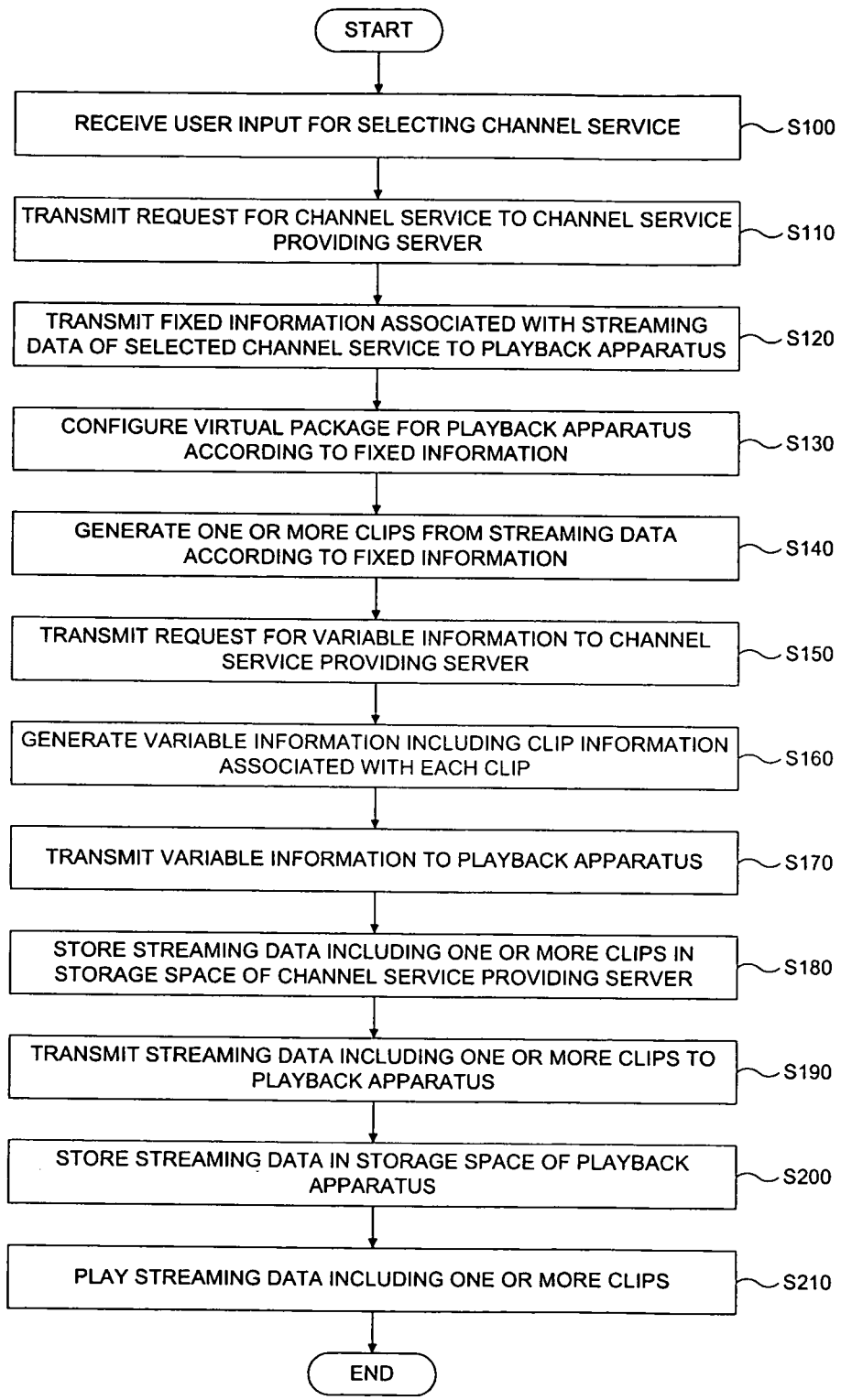
FIG. 2 is a flow diagram illustrating a method for providing a channel service in accordance with the present invention.

FIG. 2 is a flow diagram illustrating a method for providing a channel service in accordance with the present invention.

Referring to FIG. 2, a playback apparatus supporting a BD-J specification receives a user input for selecting a channel service from a user (S100).

Specifically, the playback apparatus provides an information related to the channel service transmitted by a channel service providing server to the user via a display. The user refers to the displayed information related to the channel service to select a desired channel service. The user input may be generated by using a keypad of a control device for controlling the playback apparatus such as a remote control to select the desired channel service.

Thereafter, the playback apparatus generates a request for the channel service according to the user input and transmits the request to the channel service providing server (S110).

For instance, when the channel service providing server provides ten channel services including a first channel through a tenth channel, the user may manipulate the keypad to select the fifth channel. The playback apparatus then generates the request for the channel service of the selected channel, i.e. the fifth channel, and transmit the request to the channel service providing server.

Thereafter, the channel service providing server transmits a fixed information associated with a streaming data of the selected channel service to the playback apparatus (S120).

The fixed information is an information on a format of the streaming data. Since the fixed information relates to a structure of the streaming data, one or more clips are generated from the streaming data by referring to the fixed information.

The fixed information is generated by the channel service providing server. That is, the channel service providing server may configure the fixed information in a manner that the streaming data includes the one or more clips having a certain size or a certain length or a certain number of clips.

It is preferable that the fixed information includes a BUMF (Binding Unit Manifest File) information, a SF (Signature File) information and a playlist information.

In addition, the fixed information may include a signature information and a download information of the streaming data.

Specifically, the signature information enables a verification of a validity of the streaming data. That is, the validity of clips includes in the streaming data may be verified via the signature information.

The download information includes an order for downloading the one or more clips included in the streaming data. The one or more clips are downloaded and played according to the download information. For instance, when the streaming data includes a first clip to a hundredth clip, the first clip is downloaded and played. While the first clip is played, the second clip is downloaded. After the first clip is completely played, the second clip is played. While the second clip is played, the third clip is downloaded. The playback apparatus provides the one or more clips to the user according to the download information.

Thereafter, the playback apparatus is configured to play the streaming data based on the fixed information (S130).

Specifically, the playback apparatus extracts an information on a format of the streaming data from the fixed information transmitted from the channel service providing server, and a virtual package is configured for the playback of the streaming data.

For instance, the playback apparatus capable of reading a blu-ray disk may be configured to play the streaming data received from the channel service providing server using the fixed information instead of playing a content of the blu-ray disk. The playback apparatus supporting the BD-J specification incapable of reading the blu-ray disk may also be configured to play the streaming data received from the channel service providing server using the fixed information.

Thereafter, the channel service providing server generates the one or more clips from the streaming data according to the fixed information (S140).

For instance, when the channel service selected by the user is a live broadcasting of sport event, the channel service providing server may generate the streaming data including the one or more clips according to the fixed information associated with the live broadcasting. The one or more clips included in the streaming data may be progressively generated to correspond to the live broadcasting.

When the fixed information is configured to provide the channel service using the first clip through the hundredth clip, the channel service providing server converts the streaming data of the live broadcasting to the first clip through the hundredth clip which are provided to the playback apparatus.

However, since the fixed information is unchangeable, the streaming data which lasts long time cannot be transmitted.

For instance, when the variable information is configured to transmit one hundred clips for the streaming data which lasts two hours, the channel service continuously providing sport events for 24 hours cannot provide the streaming data after two hours.

In order to overcome the limitation, the first clip through the hundredth clip are generated from first two hours of the streaming data, and another first clip through hundredth clip are generated from second two hours of the streaming data.

For instance, when the live broadcasting is provided from 11:00 AM to 3:00 PM, the channel service providing server generates the first clip through the hundredth clip from the streaming data corresponding to the live broadcasting of 11:00 AM to 1:00 PM. Thereafter, the channel service providing server generates another first clip through hundredth clip from the streaming data corresponding to the live broadcasting of 1:00 PM to 3:00 PM.

Through above-described process, the streaming data which lasts long time may be provided even when a fixed number of clips are used.

Thereafter, the playback apparatus transmits the request for a variable information to the channel service providing server (S150).

Thereafter, the channel service providing server generates the variable information including a clip information associated with each of the one or more clips when a request for the variable information is received (S160).

For instance, in case of the streaming data containing the first clip through the hundredth clip, the variable information including the clip information associated with each of the first clip through the hundredth clip may be generated.

In addition, the channel service providing server may generate the variable information including the clip information associated with a portion of the first clip through the hundredth clip. For instance, when only the generations of the first clip through the tenth clip out of the first clip through the hundredth clip are complete, the variable information including the clip information associated with the first clip through the tenth clip may be generated. That is, the variable information associated with only the generated clip may be generated even before an entirety of the one or more clips is generated.

The variable information is an information on each of the one or more clips generated in the step S140, which may change according to a size or a length of each clip. In addition, the variable information may include a stream format information of each clip, the number of packets included in each clip, an encoding specification of each clip and a time stamp information.

Further, the variable information may include an information for verifying a validity of each clip.

Thereafter, the channel service providing server transmits the variable information to the playback apparatus (S170).

Thereafter, the channel service providing server stores the streaming data including the one or more clips in a storage space of the channel service providing server (S180).

Preferably, the channel service providing server may store the one or more clips in circular queue.

As describe above, the streaming data which lasts long time should be converted to the fixed number of clips since the fixed information is unchangeable.

The fixed number of clips are stored in the storage space in circular queue.

For instance, the first clip through the hundredth clip are generated from the first two hours of the streaming data and are sequentially stored in a first slot through a hundredth slot of the storage space in circular queue. The next first clip through the hundredth clip are generated from the second two hours of the streaming data and are stored in the first slot through the hundredth slot of the storage space in circular queue by overwriting the first clip through the hundredth clip generated from the first two hours of the streaming data.

Therefore, clips generated from the last two hours of the streaming data are always stored in the storage space, and any clips within the last two hours can be provided to the user.

The reason for storing the one or more clips in the storage space in circular queue is to increase an efficiency of the storage space and prevent a deficiency of the storage space.

Thereafter, the channel service providing server transmits the streaming data including the one or more clips to the playback apparatus (S190).

Specifically, the playback apparatus generates a transmission request for the one or more clips corresponding to the clip information included in the variable information transmitted by the channel service providing server. Upon receiving the transmission request, the channel service providing server transmits the clip corresponding to the clip information according to the transmission request.

Thereafter, the playback apparatus receives the streaming data of the channel service and stores the streaming data in a storage space of the playback apparatus (S200).

For example, the playback apparatus may store the one or more clips transmitted by the channel service providing server according to the transmission request in circular queue.

Since a scheme for storing the one or more clips in circular queue in the storage space of the playback apparatus is identical to that of the channel service providing server, a detailed description is omitted.

Thereafter, the streaming data including the one or more clips is played by the playback apparatus (S210). Specifically, the playback apparatus reads and plays the clip corresponding to the channel service selected by the user from the storage space.

A configuration for providing the channel service in accordance with the present invention will be described in detail with reference to FIG. 3.

Figure 3:
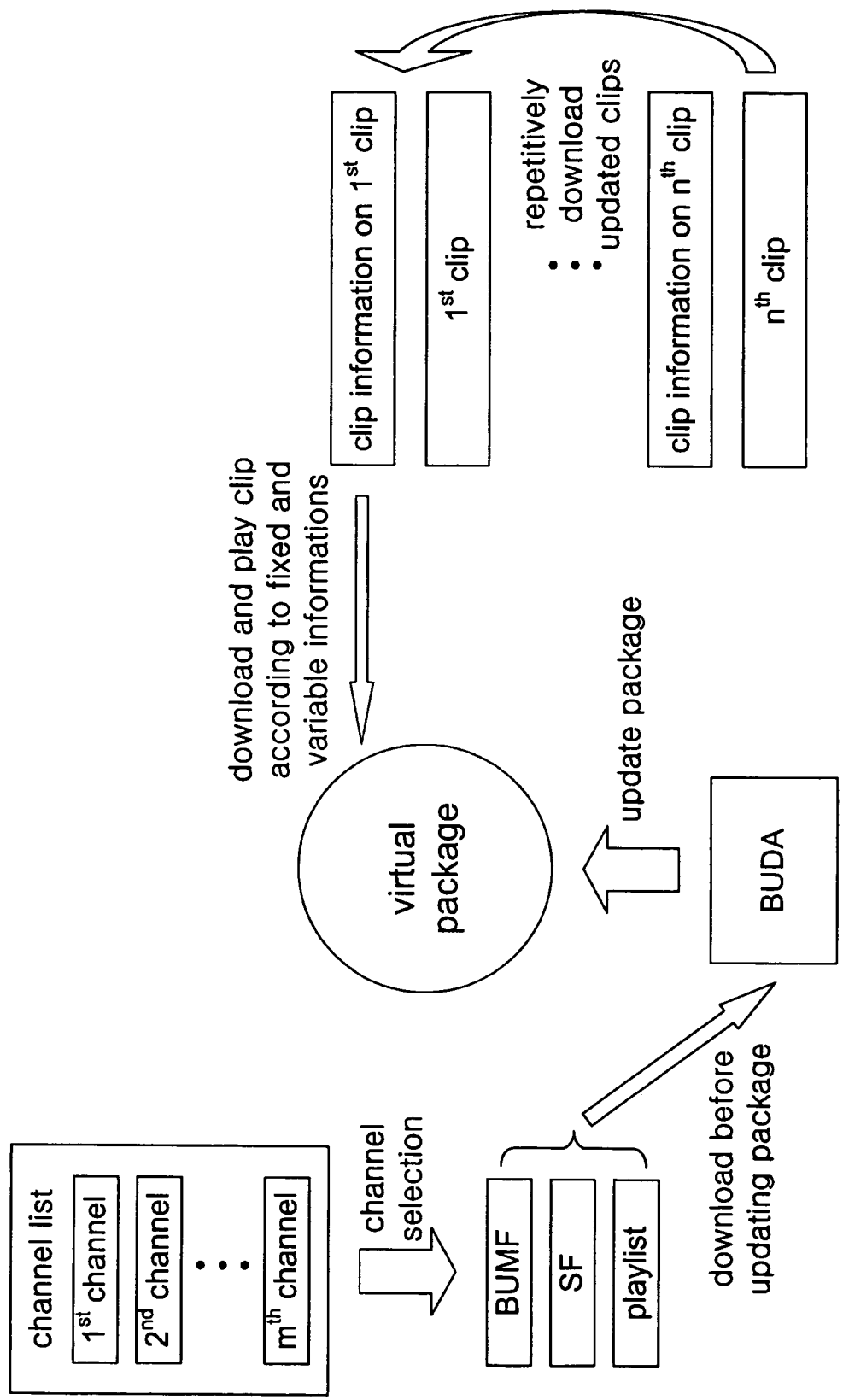
FIG. 3 is a diagram illustrating a configuration for providing a channel service using a method for providing a channel service in accordance with the present invention.

FIG. 3 is a diagram illustrating the configuration for providing the channel service using the method for providing the channel service in accordance with the present invention.

Referring to FIG. 3, a channel list containing a first channel to a $m^{th}$ channel is stored in the channel service providing server.

The user selects the desired channel service by referring to the channel list displayed by the playback apparatus supporting the BD-J specification via the display.

The playback apparatus generates the request for the channel service selected by the user and transmits the request to the channel service providing server.

The channel service providing server transmits the BUMF information, the SF information and the playlist information for the selected channel service in response to the request transmitted by the playback apparatus.

The playback apparatus receives and stores the BUMF information, the SF information and the playlist information in a BUDA. The playback apparatus then carries out a package update from a disk package to the virtual package based on the BUMF information, the SF information and the playlist information stored in the BUDA.

The channel service providing server encodes the streaming data for the channel service in real-time. Specifically, the channel service providing server the channel service providing server generates the one or more clips constituting the streaming data and also generates the clip information for each of the one or more clips. The one or more clips may be generated progressively.

The playback apparatus receives, from the channel service providing server, and plays the first clip after receiving the first clip information for the first clip. That is, in order to play the streaming data, the playback apparatus receives the clip corresponding to the clip information after receiving the clip information associated with the streaming data of the selected channel service. The playback apparatus successively receives the clip information for a next clip, and then receives and plays the next clip corresponding to the clip information.

For instance, when BUMF information is configured in a manner that a first clip through an $n^{th}$ clip are sequentially received and played, the channel service providing server constitutes the streaming data to include the first clip through the $n^{th}$ clip and generate a first clip information through an $n^{th}$ clip information associated with the first clip through the $n^{th}$ clip, respectively.

The playback apparatus sequentially receives the first clip information through the $n^{th}$ clip information, and then sequentially receive and play the clip corresponding to the clip information that has finished downloading.

After generating the $n^{th}$ clip, the channel service providing server configures a subsequent streaming data into another first clip through $n^{th}$ clip.

Therefore, the channel service providing server is capable of providing the streaming data regardless of a length thereof.

In order to correspond to above-described configuration, the playback apparatus progressively receives and plays another first clip through $n^{th}$ clip after progressively receiving and playing the first clip through the $n^{th}$ clip.

A function for storing the channel list and transmitting the BUMF information, the SF information and the playlist information for the selected channel service to the playback apparatus and a function for transmitting the clip and the clip information dynamically generated from the streaming data to the playback apparatus may be embodied in a single server or a plurality of servers.

That is, the channel service providing server may be include a first server for storing the channel list and transmitting the BUMF information, the SF information and the playlist information to the playback apparatus and a second server for transmitting the clip and the clip information dynamically generated from the streaming data to the playback apparatus.

In accordance with the present invention, the fixed information including the BUMF information, the SF information and the playlist information and the variable information including a clip information associated with a streaming data of a selected channel service is transmitted to a playback apparatus supporting a BD-J specification, thereby enabling the Blu-ray player incapable of playing the streaming data to provide viewers with the streaming data of the channel service.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for providing a channel service by a channel service providing server, the method comprising steps of:
    (a) transmitting fixed information associated with streaming data of the channel service to a playback apparatus supporting a BD-J specification according to a request for the channel service received from the playback apparatus;
    (b) after step (a), transmitting variable information associated with the streaming data to the playback apparatus according to a transmission request for the variable information received from the playback apparatus; and
    (c) after step (b), transmitting the streaming data to the playback apparatus,
    wherein the fixed information, variable information, and streaming data are different from each other,
    wherein the fixed information includes at least one of BUMF information and SF information associated with the streaming data,
    wherein the transmission request for the variable information is transmitted from the playback apparatus after the playback apparatus configures a virtual package for a playback of the streaming data based on the fixed information.
2. The method in accordance with claim 1, wherein the variable information includes clip information corresponding to each of one or more clips included in the streaming data.

3. The method in accordance with claim 2, wherein the step (b) comprises transmitting the clip information to the playback apparatus, and wherein the step (c) comprises transmitting one of the one or more clips corresponding to the clip information to the playback apparatus according to the transmission request.

4. The method in accordance with claim 2, wherein the step (b) comprises storing the one or more clips in a circular queue in a storage space.

5. A method for providing a channel service by a playback apparatus supporting a BD-J specification, the method comprising steps of:
(a) receiving fixed information associated with streaming data of the channel service from a channel service providing server according to a request for the channel service included in a user input;
(b) after step (a), configuring a virtual package for a playback of the streaming data based on the fixed information;
(c) after step (b), transmitting a request for variable information associated with the streaming data to the channel service providing server; and
(d) receiving the variable information from the channel service providing server according to the request for variable information;
(e) after step (d), playing the streaming data based on the fixed information and the variable information,
wherein the fixed information, variable information, and streaming data are different from one another,
wherein the fixed information includes at least one of BUMF information and SF information.

6. The method in accordance with claim 5, wherein the variable information includes clip information corresponding to each of one or more clips included in the streaming data.

7. The method in accordance with claim 6, wherein the step (d) comprises receiving the clip information, and wherein the step (e) comprises playing one of the one or more clips corresponding to the clip information.

8. The method in accordance with claim 6, wherein the fixed information includes playback sequence information on the one or more clips, and wherein the step (e) comprises playing the one or more clips according to the playback sequence information.

9. The method in accordance with claim 8, further comprises (f) storing the one or more clips including the streaming data in a storage space.

10. The method in accordance with claim 9, wherein the one or more clips stored in the storage space are in a circular queue.

11. The method in accordance with claim 9, wherein the step (e) comprises reading and playing at least one of the one or more clips stored in the storage space, the at least one being selected according to a user input.

12. A method for providing a channel service, the method comprising steps of:
by a playback apparatus, transmitting a request for the channel service selected in a channel list to a channel service providing server;
by the channel service providing server, transmitting BUMF (Binding Unit Manifest File) information, SF (Signature File) information and playlist information for the selected channel service to the playback apparatus;
by the playback apparatus, performing a package update from a disk package to a virtual package, based on the BUMF information, the SF information and the playlist information;
by the playback apparatus, transmitting a request for a clip information to the channel service providing server after performing the package update;
by the channel service providing server, progressively generating clips constituting streaming data and also generating clip information about each clip;
by the playback apparatus, receiving a first clip and first clip information about the first clip from the channel service providing server according to the request for a clip information and then playing the first clip; and
by the playback apparatus, receiving a second clip and second clip information about the second clip from the channel service providing server and then playing the second clip.

13. The method of claim 12, further comprising, when the BUMF information is configured in a manner that the first clip through an n-th clip are sequentially received and played, by the channel service providing server, after generating the n-th clip, configuring subsequent streaming data into another first clip through n-th clip.

14. A method of providing a channel service by a channel service providing server, the method comprising steps of:
(a) transmitting fixed information on format of streaming data of a selected channel service to a playback apparatus;
(b) after step (a), generating one or more clips from the streaming data according to the fixed information;
(c) after step (b), generating variable information on each of the one or more clips when a request for the variable information is received;
(d) after step (c), transmitting the variable information to the playback apparatus according to a transmission request for the variable information received from the playback apparatus;
(e) after step (d), storing the streaming data including the one or more clips in a storage space of the channel service providing server; and
(f) after step (e), transmitting the streaming data including the one or more clips to the playback apparatus,
wherein the fixed information, variable information, and streaming data are different from one another,
wherein the transmission request for the variable information is transmitted from the playback apparatus after the playback apparatus configures a virtual package for a playback of the streaming data based on the fixed information.

15. The method in accordance with claim 14, wherein the fixed information includes BUMF (Binding Unit Manifest File) information, SF (Signature File) information and playlist information.

16. The method in accordance with claim 14, wherein the fixed information includes signature information and download information of the streaming data, the signature information enabling a verification of the validity of the streaming data, the download information including an order for downloading the one or more clips included in the streaming data.

17. The method in accordance with claim 14, wherein the streaming data include a first clip to n-th clip, the n-th clip being downloaded while a (n-1)-th clip is played, the n-th clip being played after the (n-1)-th clip is completely played.

18. The method in accordance with claim 14, wherein when a live broadcasting is provided within a predetermined period of time, step (b) comprising:
(b1) generating the one or more clips from the streaming data corresponding to the live broadcasting of a first part of the predetermined period of time; and (b2) generating the one or more clips from the streaming data corresponding to the live broadcasting of a second part of the predetermined period of time.

19. The method in accordance with claim 14, wherein step (c) comprises generating the variable information associated with the generated clip, before the entirety of the one or more clips are generated.

20. The method in accordance with claim 14, wherein step (e) comprises storing the one or more clips in circular queue.

21. The method in accordance with claim 14, wherein step (f) comprises transmitting the one or more clips corresponding to clip in formation included in the variable information upon a transmission request for the one or more clips from the playback apparatus.

22. A method of providing a channel service by a playback apparatus supporting a BD-J specification, the method comprising steps of:

generating a first request for the channel service according to a user input;

transmitting the first request to a channel service providing server;

receiving fixed information on format of streaming data of a selected channel service from the channel service providing server, the fixed information including BUMF (Binding Unit Manifest File) information, SF (Signature File) information and playlist information;

configuring a virtual package apparatus to play the streaming data based on the fixed information;

transmitting a second request for a variable information on each of one or more clips generated by the channel service providing server to the channel service providing server after configuring the virtual package;

receiving the variable information from the channel service providing server;

generating a transmission request for the one or more clips corresponding to clip information included in the variable information; and receiving the streaming data including the one or more clips from the channel service providing server, wherein the fixed information, variable information, and streaming data are different from one another.

23. The method in accordance with claim 22, wherein the BUMF information is configured in a manner that a first clip through an n-th clip are sequentially received and played, the method further comprising:

sequentially receiving first clip information through n-th clip information generated by the channel service providing server; and sequentially receiving and playing a clip corresponding to the clip information that has finished downloading.

\* \* \* \* \*